US005859654A

United States Patent [19]

Radke et al.

[11] Patent Number: 5,859,654

[45] Date of Patent: Jan. 12, 1999

[54] PRINT HEAD FOR INK-JET PRINTING A METHOD FOR MAKING PRINT HEADS

[75] Inventors: Gerold Radke, Lebanon; Leonard A. Rosi, Philomath, both of Oreg.

[73] Assignee: Hewlett-Packard Company, Palo Alto, Calif.

[21] Appl. No.: 742,118

[22] Filed: Oct. 31, 1996

[51] Int. Cl.[6] .............................. G01D 15/18; B41J 2/14; B41J 2/16

[52] U.S. Cl. ................................ 347/45; 347/47; 347/65; 156/319

[58] Field of Search ................................ 347/45, 47, 65; 156/319

[56] References Cited

U.S. PATENT DOCUMENTS

| | | | |
|---|---|---|---|
| 4,077,932 | 3/1978 | Columbus | 260/29.6 |
| 4,350,616 | 9/1982 | Pan et al. | 428/131 |
| 4,535,343 | 8/1985 | Wright et al. | 347/64 |
| 4,853,300 | 8/1989 | Pike | 156/319 |
| 5,086,307 | 2/1992 | Noguchi et al. | 347/65 |
| 5,493,320 | 2/1996 | Sandbach, Jr. et al. | 347/47 |

OTHER PUBLICATIONS

Hewlett Packard Journal, May 1985, Aug. 1988, Oct. 1988, Aug. 1992, Dec. 1992, Feb. 1994.

*Primary Examiner*—Benjamin R. Fuller
*Assistant Examiner*—Christina Annick

[57] ABSTRACT

A print head for ink-jet printing. The print head includes an orifice plate with a layer of metal bonded thereto, an ink barrier layer, and an adhesion promoter located between the metal layer and the barrier. The adhesion promoter bonds the metal layer to the barrier layer. Adhesion promoters include organosilane, polyacrylic acid, or polymethylacrylic acid. In a process for making a print head, an adhesion promoter is applied to the orifice plate and the orifice plate, the barrier layer, and the adhesion promoter are bonded together by applying pressure and heat.

3 Claims, 3 Drawing Sheets

PRINT HEAD FOR INK-JET PRINTING A METHOD FOR MAKING PRINT HEADS

FIELD OF INVENTION

The present invention generally relates to ink-jet printing and, more particularly, to print heads for ink-jet print cartridges and methods for manufacturing such print heads.

BACKGROUND OF THE INVENTION

The art of ink-jet technology is relatively well developed. Commercial products such as computer printers, graphics plotters, and facsimile machines employ ink-jet technology for producing printed media. Hewlett-Packard's contributions to this technology are described, for example, in various articles in the *Hewlett-Packard Journal,* Vol. 36, No. 5 (May 1985), Vol. 39, No. 4 (August 1988), Vol. 39, No. 5 (October 1988), Vol. 43, No. 4 (August 1992), Vol. 43, No. 6 (December 1992), and Vol. 45, No. 1 (February 1994).

Generally, an ink-jet image is formed when a precise pattern of dots is ejected from a drop generating device known as a "print head" onto a printing medium. The typical ink-jet print head has an array of precisely formed nozzles in an orifice plate that is attached to an ink barrier layer on a thermal ink-jet print head substrate. The substrate incorporates an array of firing chambers that receive liquid ink (colorant dissolved or dispersed in a solvent) from an ink reservoir. Each chamber has a thin-film resistor, known as a "firing resistor", located opposite each nozzle so ink can collect between the firing resistor and the nozzle. When electric printing pulses heat the thermal ink-jet firing resistor, a small volume of ink adjacent the firing resistor is heated, vaporizing a bubble of ink, and thereby ejecting a drop of ink from the print head. The droplets strike the printing medium and then dry to form "dots" that, when viewed together, form the printed image.

The physical arrangement of orifice plate, ink barrier layer, print head substrate, and various intermediate layers on the substrate is further described and illustrated at page 44 of the *Hewlett-Packard Journal* of February 1994, cited above.

In ink-jet print head technology the orifice plate is expected to be permanently attached to the ink barrier layer on the print head substrate. Delamination of the interface between the orifice plate and the barrier layer has always been a problem but recently the problem has increased in significance.

Delamination principally occurs from environmental moisture and the ink itself. Environmental moisture develops from storing the print cartridge in a capping station on the printer, in normal, open room storage, or in shipping packages. Environmental moisture has become an increasing problem because print cartridges are increasingly being subjected to longer and longer periods of storage. As for ink, it has become a problem because some inks wick much more into the interface between the orifice plate and the barrier. Such inks contain surfactants and solvents that increase the capillary effect at the orifice plate-ink barrier interface.

Delamination of the orifice plate is manifested in several ways. Full delamination occurs when the orifice plate falls off the print cartridge. The print cartridge deprimes, and the electrical leads within the printer can be shorted out. When partial delamination occurs, print cartridge performance and print quality can degrade markedly. Delamination changes the architecture of the ink conduits and firing chambers. Fluidic isolation of the firing chambers can be lost, crosstalk between the firing chambers and ink conduits can develop, and if there are inks of different colors in adjacent chambers, color mixing can occur.

U.S. Pat. No. 5,493,320 entitled "Ink-jet Printing Nozzle Array Bonded to a Polymer Ink Barrier Layer" by Sandbach et al. issued on Feb. 20, 1996 recognizes the problem of orifice plate-ink barrier layer delamination. This patent, however, does not go far enough and does not contemplate the measures needed to be taken against very aggressive inks and increased storage times in printers, open room environment, or shipping packages.

It will be apparent from the foregoing that although there are many varieties of print cartridges and processes for making them, there is still a need for an approach that avoids both full and partial delamination of the orifice plate-ink barrier layer interface.

SUMMARY OF THE INVENTION

Briefly and in general terms, a print head for ink-jet printing according to the present invention includes an orifice plate with a layer of metal bonded thereto, an ink barrier layer, and an adhesion promoter located between the metal layer and the barrier. The adhesion promoter bonds the metal layer to the barrier layer.

Further, the invention includes a process for making a print head for ink-jet printing comprising the steps of providing an ink-jet orifice plate and an ink barrier layer attached to a print head substrate, applying a layer of an adhesion promoter to the orifice plate, and laminating the orifice plate to the barrier layer by applying pressure and heat.

The problem of delamination caused by aggressive inks and environmental moisture is addressed by an adhesion promoter located between the orifice plate and the barrier layer. It is believed that for the organosilane adhesion promoters, a tantalum-oxygen-silicon bond is formed and for the polyacrylic acid, PAA, and polymethylacrylic acid, PMAA, adhesion promoters, a metal-acid complex is formed.

Other aspects and advantages of the invention will become apparent from the following detailed description, taken in conjunction with the accompanying drawing and graphs, illustrating by way of example the principles of the invention.

DESCRIPTION OF THE PREFERRED EMBODIMENTS

Figure 1:
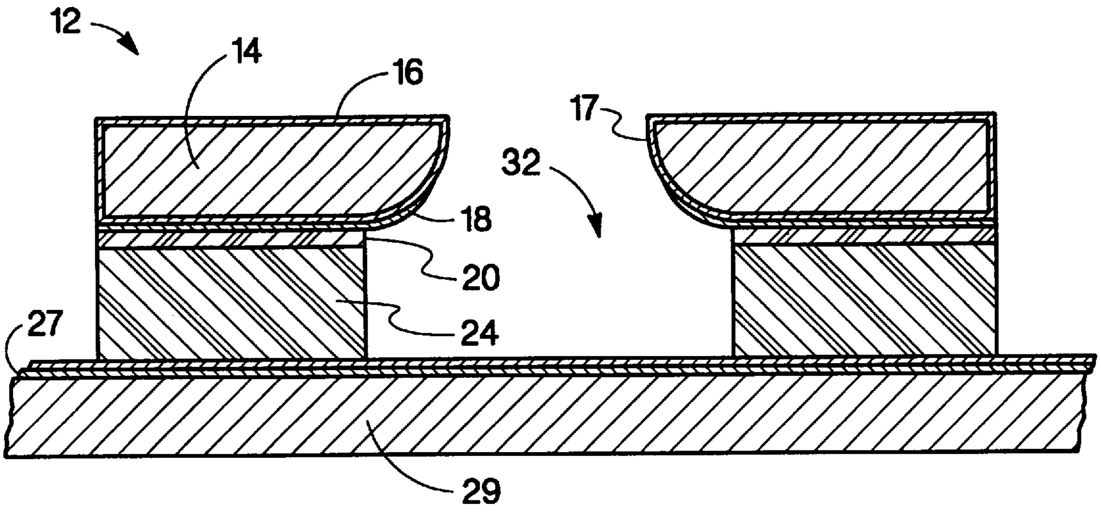
FIG. 1 is side elevational view, in cross section, of an adhesion promoter bonding an orifice plate to a barrier layer in an ink-jet print head, embodying the principles of the invention.

As shown in the drawings, tables and graphs, the invention is embodied in an improved print head for ink-jet printing and in a process for making such print heads.

The problem of delamination caused by aggressive inks and environmental moisture is addressed by an adhesion promoter located between the orifice plate and the ink barrier layer.

Referring to FIG. 1, reference numeral 12 generally indicates an ink-jet print head for ink-jet printing. The print head 12 includes a nozzle plate 14 that is fabricated from nickel and electroformed on a mandrel. The nozzle plate is about 50 microns thick. The nozzle plate 14 has a coating 16 of gold that is about 1.5 to about 3 microns thick. Other coatings can be used including nickel, chromium and palladium. The nozzle plate 14 also contains a nozzle generally indicated by reference numeral 17. On the lower surface of the nozzle plate 14 on the gold coating 16 is a metal layer 18. The metal layer is a layer that will develop an oxide that will chemically bond to the adhesion promoter. Either chromium or tantalum can be used and in the preferred embodiment tantalum is used. The Ta layer 18 is sputtered onto the coating 16 and has a thickness of between about 200 Å and about 1300 Å.

Reference numeral 24, FIG. 1 generally indicates an ink barrier layer. The ink barrier 24 is fabricated from polymethylmethacrylate PMMA which is obtainable from E. I. du Pont de Nemours and Company of Wilmington, Del.

Laminated between the layer 18 on the orifice plate 14 and the ink barrier layer 24 is an adhesion promoter 20. The adhesion promoter is formed from either organosilane, polyacrylic acid herein referred to as PAA, or polymethylacrylic acid herein referred to as PMAA. The silanes are obtainable from the Dow Corning Corporation of Midland, Mich. and are identified in FIG. 2 and Table A by their product numbers. The PAA and the PMAA are obtainable from Polysciences, Inc. of Warrington, Pa.

Referring to FIG. 1, reference numeral 27 generally indicates a plurality of intermediate layers of various materials which are deposited on a print head substrate 29 fabricated from silicon dioxide. The barrier layer 24, the intermediate layers 27 and the substrate 29 define the firing chamber 32.

ORGANOSILANE ADHESION PROMOTERS

To apply the adhesion promoter 20 to the orifice plate, the orifice plate is dipped in an aqueous solution of organosilane having a concentration of between about 0.01% to about 1.0% in water. The preferred silane concentration is about 0.1%. After the dipping process, the orifice plate is rinsed and rotated at about 1500 rpm to remove any excess silane. The orifice plate and the layer of silane promoter are then heated for 5 minutes at 70° C. to 100° C.

A wafer, not shown, is covered with a plurality of individual print head substrates 29. Each substrate has a layer 24 of ink barrier material already cured thereon. The individual orifice plates 14 are placed on the ink barrier layers so that the orifice plates, adhesion promoter layers, and substrates are in registration. Registration is necessary so that the architecture of the firing chambers 32 is precisely obtained.

The wafer with the orifice plates and adhesion layers in place is placed in a laminator and compressed at a pressure of about 150 psi at about 200° C. for about 10 minutes. Thereafter, the wafer is placed in an oven at 220° C. for 30 minutes. Next, each print head is sawed off the wafer and the application process is completed.

The completed print heads were tested by soaking the print heads in a solution of ink at a temperature of 60° C. for differing periods of time. Ink at an elevated temperature was used for testing in order to accelerate the delamination process. At selected times an individual print head was removed from the ink and rinsed in water. Thereafter, the print head was push tested. A force was applied perpendicularly between the orifice plate and the substrate by a mechanical tool, not shown. The force was increased until the orifice plate separated from the substrate. The amount of applied force and the movement of the tool were measured. The work of adhesion was obtained by integrating the area under the curve of applied force and the movement of the tool. The work of adhesion is measured in newton-millimeters. The push strength is the maximum force necessary to separate the orifice plate from the substrate and is measured in pounds. It is desired that the work of adhesion and the push strength be maximized.

Referring to Table A below and FIG. 2, the results of the testing are tabulated and illustrated. The following organosilanes were tested:

aminoethyl aminopropyl trimethoxysilane, Dow Corning Z-6020

3-chloropropyl trimethoxysilane, Dow Corning Z-6026 glycidoxypropyl trimethoxysilane, Dow Corning Z-6040 gamma-aminopropyl triethoxysilane, Dow Corning Z-6011 methacryloxypropyl trimethoxysilane, Dow Corning Z-6030.

The controls were orifice plates without adhesion promoters and, in particular, orifice plates with either a layer 18 of Palladium (Pd) or a layer 18 of Ta.

TABLE A

Work of Adhesion (newton-mm) of Tantalum with Organosilane Adhesion Promoters

| Number | Coating on Nozzle Plate | Adhesion Promoters | Day 0 | Day 1 | Day 3 | Day 6 | Day 14 | Day 30 |
|---|---|---|---|---|---|---|---|---|
| 1 | Ta | 6020 | 18.31 | 8.70 | 7.16 | 6.85 | 6.03 | 5.25 |
| 2 | Ta | 6030 | 18.28 | 8.65 | 7.08 | 5.18 | 4.97 | 2.97 |
| 3 | Ta | 6011 | 15.46 | 8.58 | 5.83 | 6.01 | 5.91 | 4.76 |
| 4 | Ta | 6040 | 17.35 | 8.43 | 6.52 | 5.60 | 5.56 | 3.92 |
| control | Ta | none | 17.53 | 7.14 | 1.17 | 0.50 | 0.41 | — |

Figure 2:
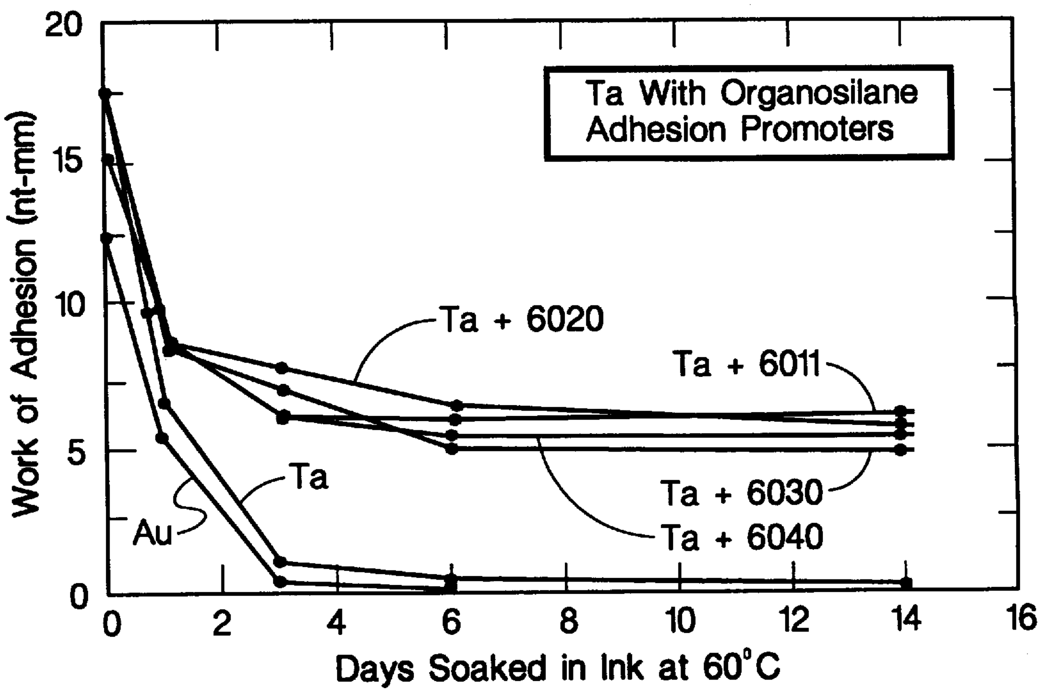
FIG. 2 is a plot of the work of adhesion between a barrier layer and an orifice plate having a tantalum (Ta) layer bonded thereto, using various organosilane adhesion promoters versus the number of days that a print head was soaked in ink at 60° C. depicting the improvement in the resistance to delamination as a result of organosilane adhesion promoters.

It should be appreciated from FIG. 2 that after about three days of soaking in ink at 60° C., the orifice plates without an adhesion promoter had essentially fallen off of the substrate. These were the orifice plates with just layers of Palladium (Pd) and Tantalum (Ta) only.

POLYACRYLIC ACID PAA AND POLYMETHYLACRYLIC ACID (PMAA) ADHESION PROMOTERS

The PAA is applied to the orifice plates by first dipping the orifice plates in a 1% solution of PAA for 3 minutes and then drying the orifice plates in an oven at 150° C. for 5 minutes. The orifice plates are thereafter washed in deionized water at 50° C. for 30 minutes. During the washing process the orifice plates are agitated. Next, the orifice plates are air dried and laminated to the print head substrate as described above.

For PAA a molecular weight of between 90,000 and 250,000 daltons is used and a molecular weight of about 100,000 to 200,000 daltons is preferred.

In addition, a thickness of less that 5 monlayers of PAA on the orifice plate is preferred. This thin layer is obtained by controlling the concentration of PAA solution and the water rinse time as described above. A concentration of PAA of between 0.05% and 10% is used and a concentration of 1.0% in water is preferred.

Figure 3:
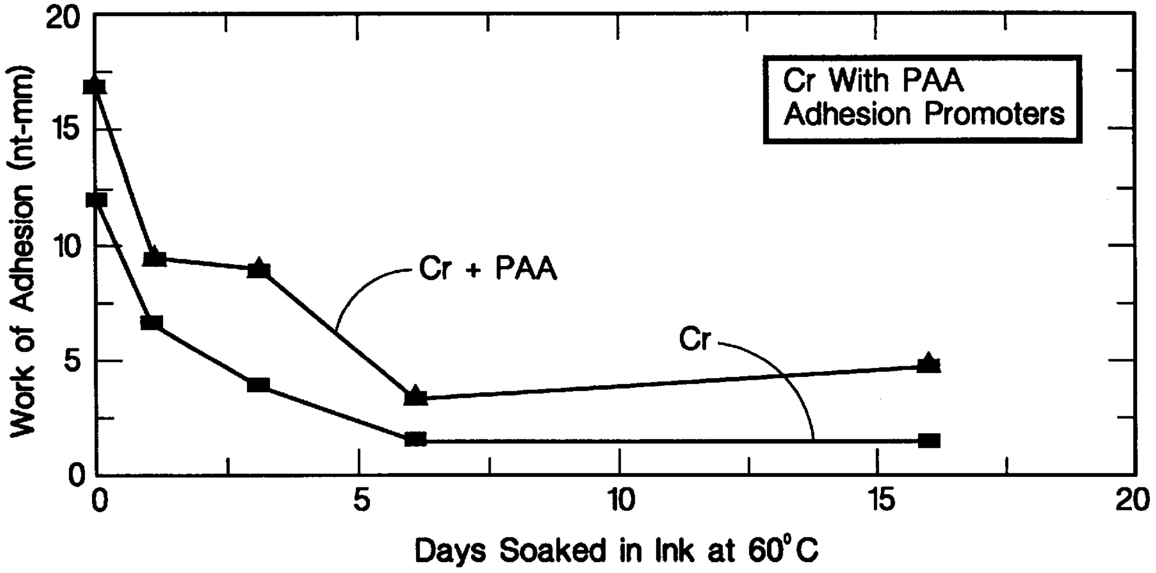
FIG. 3 is a plot of the work of adhesion between a barrier layer and an orifice plate having a chromium (Cr) layer bonded thereto, using a polyacrylic acid PAA adhesion promoter versus the number of days that a print head was soaked in ink at 60° C. depicting the improvement in the resistance to delamination as a result of a PAA adhesion promoter.
Figure 4:
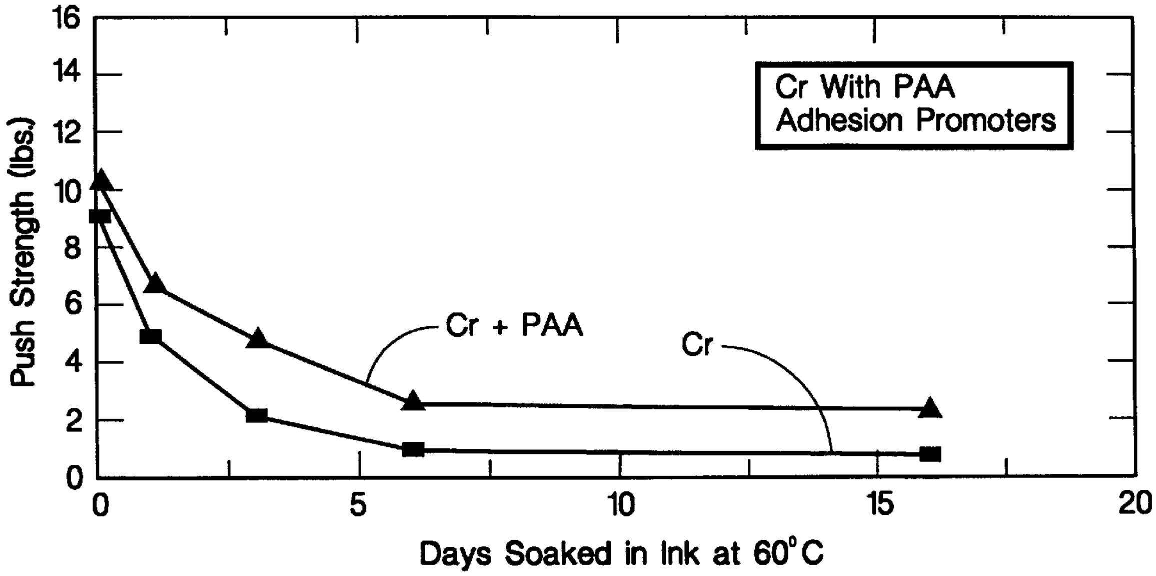
FIG. 4 is a plot of the push strength between a barrier layer and an orifice plate having a chromium (Cr) layer bonded thereto, using a polyacrylic acid PAA adhesion promoter, versus the number of days that a print head was soaked in ink at 60° C. depicting the improvement in the resistance to delamination as a result of the PAA adhesion promoter.
Figure 5:
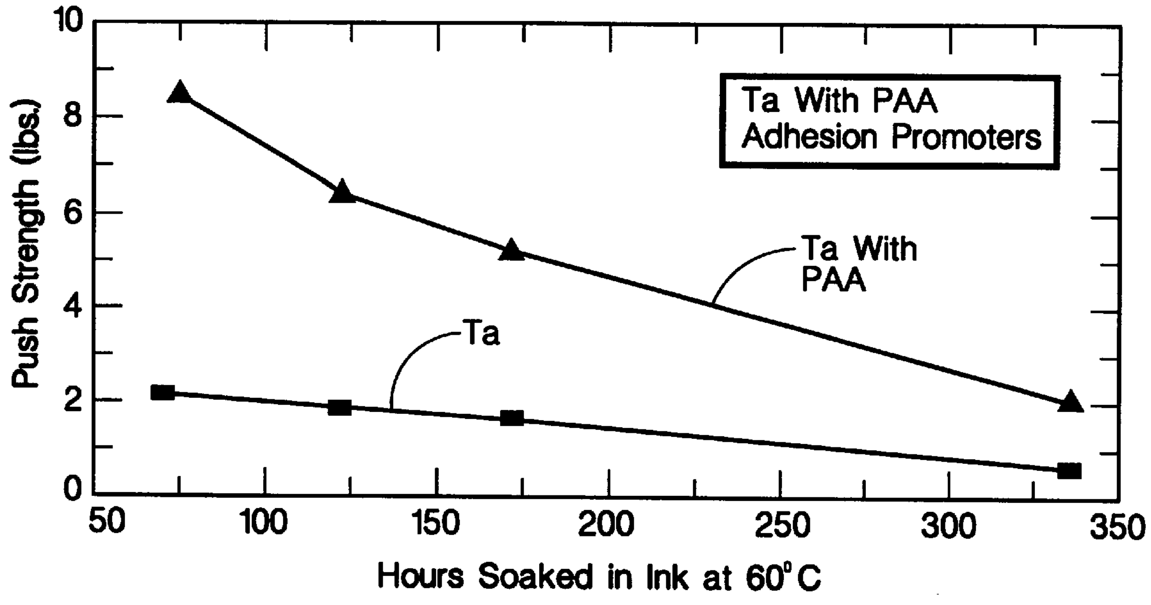
FIG. 5 is a plot of the push strength between a barrier layer and an orifice plate having a tantalum (Ta) layer bonded thereto, using a polyacrylic acid PAA adhesion promoter, versus the number of hours that a print head was soaked in ink at 60° C. depicting the improvement in the resistance to delamination as a result of the PAA adhesion promoter.

FIGS. 3 and 4 and Tables B and C below illustrate Cr with PAA and also the correspondence of the work of adhesion with push strength for the same materials over the same periods of time.

TABLE B

Work of Adhesion (newton-millimeters) of Chromium with and without Polyacrylic Acid PAA Adhesion Promoters

| Number | Coating on Nozzle Plate | Day 0 | Day 1 | Day 3 | Day 6 | Day 16 |
|---|---|---|---|---|---|---|
| 1 | Cr | 11.91 | 6.34 | 3.7 | 1.55 | 1.39 |
| 2 | Cr + PAA | 16.9 | 9.25 | 8.91 | 3.34 | 4.7 |

TABLE C

Push Strength (lbs.) Of Chromium with and without Polyacrylic Acid PAA Adhesion Promoters

| Number | Coating on Nozzle Plate | Day 0 | Day 1 | Day 3 | Day 6 | Day 16 |
|---|---|---|---|---|---|---|
| 1 | Cr | 9.52 | 4.82 | 2.13 | 1.06 | 0.76 |
| 2 | Cr + PAA | 10.32 | 6.6 | 4.72 | 2.43 | 2.2 |

Figure 6:
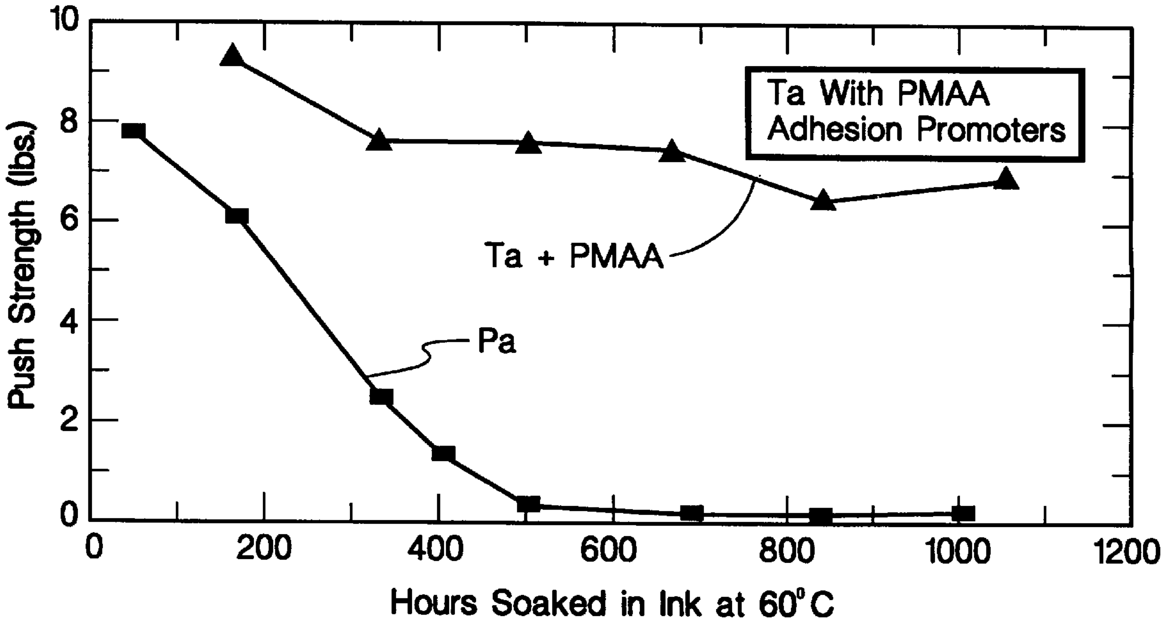
FIG. 6 is a plot of the push strength between a barrier layer and an orifice plate having a tantalum (Ta) layer bonded thereto, using a polymethylacrylic acid PMAA adhesion promoter, versus the number of hours that a print head was soaked in ink at 60° C. depicting the improvement in the resistance to delamination as a result of the PMAA adhesion promoter.

The ink used in Table E and FIG. 6 was different from the ink used in the other tables and figures. This other ink was used in all tests except Table E and FIG. 6

TABLE D

Push Strength (lbs.) Of Tantalum with and without Polyacrylic Acid PAA Adhesion Promoters

| Number | Coating on Nozzle Plate | Hours 71 | Hours 23 | Hours 172 | Hours 336 |
|---|---|---|---|---|---|
| 1 | Ta | 2.1 | 1.8 | 1.6 | 0.6 |
| 2 | Ta + PAA | 8.5 | 6.4 | 5.2 | 2.0 |

For the PMAA adhesion promoter, Table E, the orifice plates are prepared and the PMAA is applied in the same manner as described above.

TABLE E

Push Strength (lbs.) Of Palladium and Polymethylacrylic Acid PMAA Adhesion Promotor on Tantalum

| No. | Coating of Nozzle Plate | Hrs. 52 | Hrs. 169 | Hrs. 336 | Hrs. 405 | Hrs. 504 | Hrs. 692 | Hrs. 836 | Hrs. 1005 |
|---|---|---|---|---|---|---|---|---|---|
| 1 | Pd | 7.8 | 6.1 | 2.5 | 1.4 | 0.4 | 0.22 | 0.21 | 0.21 |
| 2 | PMAA + Ta | | 9.3 | 7.7 | | 7.7 | 7.5 | 6.5 | 7.0 |

Table E compares ink soak testing of Palladium only orifice plates to PMAA on tantalum sputtered on Palladium coated orifice plates.

Although specific embodiments and processes of the invention have been described and illustrated, the invention is not to be limited to the specific forms or arrangement of parts so described and illustrated. The invention is limited only by the claims.

We claim:

1. A print head for ink-jet printing, comprising:

(a) an orifice plate comprised of at least one metal;

(b) a layer of oxidizable metal bonded to said orifice plate, said oxidizable metal being selected from the group consisting of tantalum and chromium;

(c) an ink barrier layer comprised of an organic polymer composition; and (d) an organic adhesion promoter positioned between said ink barrier layer and said layer of oxidizable metal, said organic adhesion promoter bonding said layer of oxidizable metal to said ink barrier layer in order to prevent detachment of said orifice plate from said print head, said organic adhesion promoter being selected from the group consisting of polyacrylic acid, polymethylacrylic acid, an organosilane composition, and mixtures thereof.

2. The print head of claim 1 wherein said polyacrylic acid has a molecular weight of about 90,000–250,000 daltons.

3. The print head of claim 1 wherein said organosilane composition is selected from the group consisting of aminoethyl aminopropyl trimethoxysilane, 3-chloropropyl trimethoxysilane, glycidoxypropyl trimethoxysilane, gamma-aminopropyl triethoxysilane, methacryloxypropyl trimethoxysilane, and mixtures thereof.

* * * * *